(12) United States Patent
Sultenfuss et al.

(10) Patent No.: US 9,991,743 B2
(45) Date of Patent: *Jun. 5, 2018

(54) SYSTEM AND METHOD FOR PROVIDING WIRELESS POWER IN A REMOVABLE WIRELESS CHARGING MODULE

(71) Applicant: Dell Products, LP, Round Rock, TX (US)

(72) Inventors: Andre T. Sultenfuss, Leander, TX (US); Kevin W. Mundt, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 35 days.

This patent is subject to a terminal disclaimer.

(21) Appl. No.: 14/868,318

(22) Filed: Sep. 28, 2015

(65) Prior Publication Data
US 2016/0020641 A1    Jan. 21, 2016

Related U.S. Application Data

(63) Continuation of application No. 13/538,051, filed on Jun. 29, 2012, now Pat. No. 9,166,438.

(51) Int. Cl.
*H02J 7/00* (2006.01)
*H02J 50/10* (2016.01)
*H02J 50/70* (2016.01)
*H02J 50/90* (2016.01)
*H02J 50/80* (2016.01)
*H02J 7/02* (2016.01)
*H01F 38/14* (2006.01)
*B60L 11/18* (2006.01)

(52) U.S. Cl.
CPC .............. *H02J 50/10* (2016.02); *H02J 7/025* (2013.01); *H02J 50/70* (2016.02); *H02J 50/80* (2016.02); *H02J 50/90* (2016.02); *B60L 11/182* (2013.01); *H01F 38/14* (2013.01); *H02J 7/0055* (2013.01); *H02J 2007/0096* (2013.01)

(58) Field of Classification Search
CPC .......... H02J 7/025; H02J 50/10; H02J 7/0004; H02J 7/0042; H02J 2007/0096; H02J 7/0055; B60L 11/182; H01F 38/14
See application file for complete search history.

(56) References Cited

U.S. PATENT DOCUMENTS

| | | | |
|---|---|---|---|
| 6,605,924 B2 | 8/2003 | Tanaka et al. |
| 6,864,666 B2 | 3/2005 | Breen et al. |
| 7,930,469 B2 | 4/2011 | Brittain et al. |
| 7,956,578 B2 | 6/2011 | Odaohara |
| 8,234,509 B2 | 7/2012 | Gioscia et al. |
| 8,248,024 B2 | 8/2012 | Yuan et al. |
| 8,350,533 B2 | 1/2013 | Tam et al. |

(Continued)

*Primary Examiner* — Helen Rossoshek
(74) *Attorney, Agent, or Firm* — Larson Newman, LLP

(57) ABSTRACT

A wireless charging module includes an antenna and a wireless charger module. An enclosure is configured to fit at least partially within an optical drive bay of an information handling system. The antenna is disposed within a plastic lower portion of the enclosure. The plastic lower portion of the enclosure is configured to enable the antenna to wirelessly receive power from a wireless charging pad. The wireless charger module is disposed within the enclosure, and is configured to provide power to the information handling system.

16 Claims, 6 Drawing Sheets

(56) References Cited

U.S. PATENT DOCUMENTS

| | | | |
|---|---|---|---|
| 8,656,193 B2 | 2/2014 | Hijazi et al. | |
| 8,686,685 B2 | 4/2014 | Moshfeghi | |
| 2009/0037632 A1 | 2/2009 | Downing | |
| 2009/0284227 A1* | 11/2009 | Mohammadian | G06K 7/0008 320/137 |
| 2010/0039066 A1 | 2/2010 | Yuan et al. | |
| 2010/0278195 A1 | 11/2010 | Wagh et al. | |
| 2011/0050164 A1 | 3/2011 | Partovi et al. | |
| 2011/0179292 A1 | 7/2011 | Clegg et al. | |
| 2011/0202777 A1 | 8/2011 | Hijazi et al. | |
| 2011/0258112 A1 | 10/2011 | Eder et al. | |
| 2012/0017104 A1 | 1/2012 | Siba et al. | |
| 2012/0065909 A1 | 3/2012 | Patino et al. | |
| 2012/0235636 A1 | 9/2012 | Partovi | |
| 2013/0020875 A1 | 1/2013 | Wozniak et al. | |
| 2013/0093385 A1 | 4/2013 | Patino et al. | |
| 2013/0093388 A1 | 4/2013 | Partovi | |
| 2013/0119929 A1 | 5/2013 | Partovi | |
| 2013/0260677 A1 | 10/2013 | Partovi | |
| 2013/0311798 A1 | 11/2013 | Sultenfuss et al. | |
| 2014/0001874 A1 | 1/2014 | Nahidipour | |
| 2014/0091626 A1 | 4/2014 | Walley et al. | |
| 2014/0132201 A1 | 5/2014 | Tsang | |
| 2014/0279528 A1 | 9/2014 | Slaby et al. | |

* cited by examiner

US 9,991,743 B2

SYSTEM AND METHOD FOR PROVIDING WIRELESS POWER IN A REMOVABLE WIRELESS CHARGING MODULE

CROSS REFERENCE TO RELATED APPLICATIONS

This application is a continuation of U.S. patent application Ser. No. 13/538,051, entitled "System and Method for Providing Wireless Power in a Removable Wireless Charging Module," filed on Jun. 29, 2012, the disclosure of which is hereby expressly incorporated by reference in its entirety.

FIELD OF THE DISCLOSURE

This disclosure generally relates to information handling systems, and more particularly relates to a system and method for providing wireless power in a removable wireless charging module.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

A wireless power delivery system typically includes a wireless charging pad on to which a device can be placed for charging. The device can communicate with the pad via near field communication (NFC) to indicate that the device available to receive power. The wireless power delivery system can then wirelessly transmit power to the device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
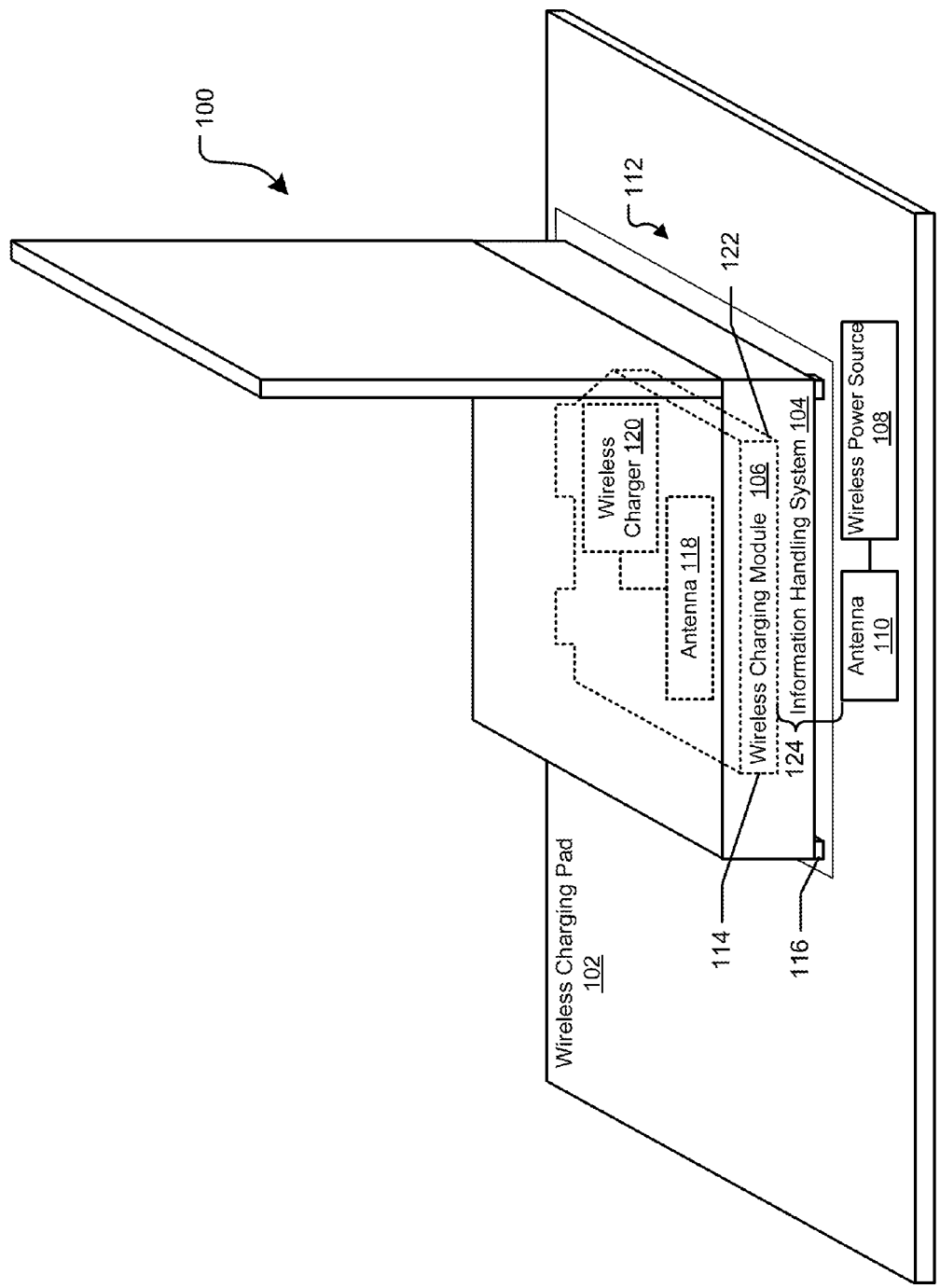
FIG. 1 is a block diagram of a wireless power delivery system.

FIG. 1 illustrates a wireless power delivery system 100 for an information handling system. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The wireless power delivery system 100 includes a wireless charging pad 102, an information handling system 104, and a wireless charging module 106. The wireless charging pad 102 includes a wireless power source 108, an antenna 110, and a landing pad 112. The information handling system 104 includes an optical drive bay 114 and pads 116. The wireless charging module 106 includes an antenna 118 and a wireless charger 120. The wireless power source 108 is in communication with the antenna 110, which in turn is in communication with the antenna 118 of the wireless charging module 106. The antenna 118 is in communication with the wireless charger 120.

The wireless charging module 106 can be shaped to fit within a standard optical drive bay, such as the optical drive bay 114 of the information handling system 104. Thus, the wireless charging module 106 can be inserted into the optical drive bay 114 of the information handling system 104, and can connect with the information handling system via one or more buses. For example, the wireless charging module 106 can connect with the information handling system via a communication bus, such as a serial advanced technology attachment (SATA) mini bus 322 (shown in FIG.

3), to communicate with the information handling system. The wireless charging module 106 can also connect with the information handling system 104 to provide power to the information handling system via a high power connector 324 (shown in FIG. 3).

When the wireless charging module 106 is connected to the information handling system 104, the wireless charger 120 of the wireless charging module can communicate with the information handling system, via the SATA mini bus 322, to provide information about the wireless charging module. For example, information can include a class of the wireless charging module 106, an amount of power that the wireless charging module can provide, a type of the wireless charging module, a maximum amount of voltage that the wireless charging module can provide, and the like. The information handling system 104 can use the information to detect whether the wireless charging module 106 is compatible with a power system of the information handling system. When the information handling system 104 has determined that the wireless charging module 106 is a compatible charging module, the information handling system can sent the power system in a ready state to receive power from the wireless charging module.

The wireless charging pad 102 can detect when a device such as the information handling system 104 is placed on top the landing pad 112 of the wireless charging pad, and can transmit a detect signal in response to detecting the device. For example, the wireless charging pad 102 can detect the information handling system 104 when a light sensor on the wireless charging pad 102 is covered by the information handling system, by a pressure sensor of the wireless charging pad detecting the information handling system, by metal tabs of the wireless charging pad being placed in physical communication with the information handling system, and the like. The information handling system 104 can receive the detect signal from the wireless charging pad, and can respond by transmitting a presence signal to the wireless charging pad. The presence signal can include a repeating pulse signal, referred to as a chirp, and can also include information associated with the information handling system 104 and the wireless charging module 106, such as a class of the information handling system and the class of the wireless charging module. The class of the information handling system 104 and the class of the wireless charging module 106 can indicate a maximum power needed for the information handling system, or the like. In an embodiment, the landing pad 112 can be a designated location of the wireless charging pad 102 with a specific orientation for the information handling system 104 so that the antennas 110 and 118 can align properly.

The wireless charging module 106 includes a plastic bottom portion 122 of an enclosure of the wireless charging module. The remaining portions, such as front, back, left, right, and top portions, of the enclosure of the wireless charging module 105 can be metal, plastic, or any other type of material capable of supporting and protecting the components located within the wireless charging module. The bottom portion of the wireless charging module 106 is plastic to enable the antenna 118 of the wireless charging module to communicate with the antenna 110 of the wireless charging pad 102. Similarly, the information handling system 104 includes a bottom portion 202, which in turn includes a non-metallic portion 204 as shown in FIG. 2.

Figure 2:
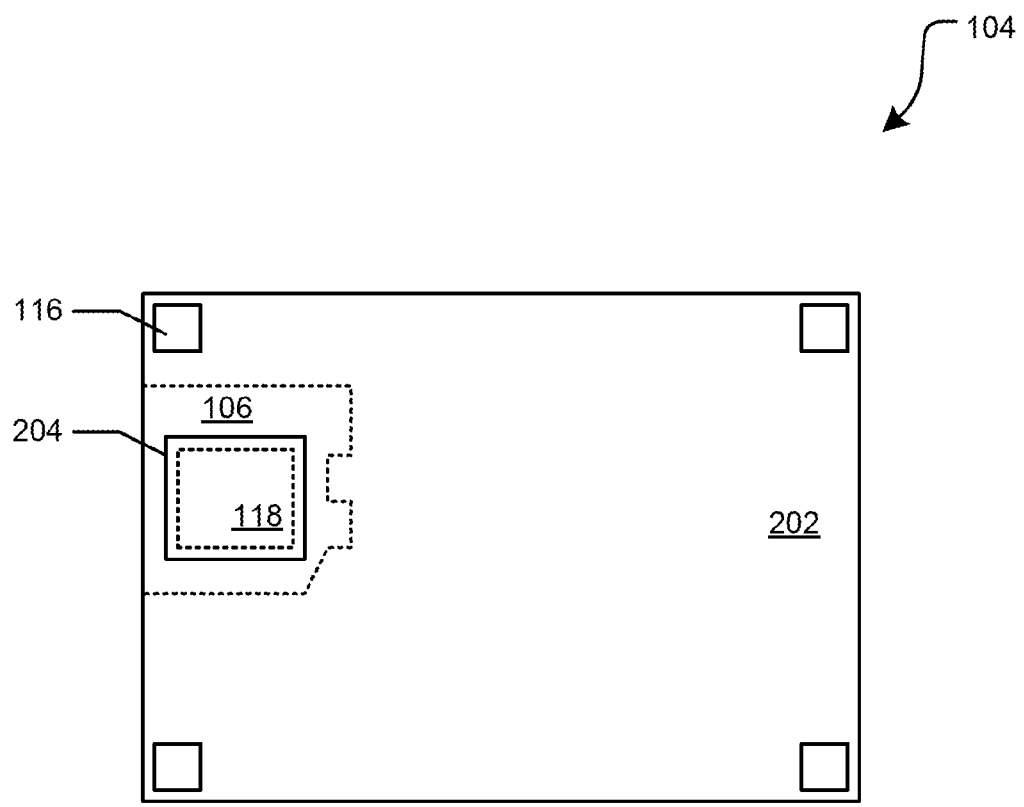
FIG. 2 is a block diagram of an information handling system of the wireless power delivery system.

FIG. 2 shows the information handling system 104 including the bottom portion 202, the non-metallic portion 204, and the pads 116. In an embodiment, an enclosure of the information handling system 104, including the bottom portion 202, is a metal enclosure, such as a magnesium metal alloy. If the metal enclosure of the information handling system 104 is between the antenna 118 of the wireless charging module 106 and the antenna 110 of the wireless charging pad 102 of FIG. 1, the metal enclosure can prevent a power transfer between the two antennas.

Thus, the non-metallic portion 204 of the bottom portion 202 can be positioned so that the non-metallic portion is located below the antenna 118 when the wireless charging module 106 in inserted into the information handling system 104. The position of the non-metallic portion 204 below the antenna 118 can enable the antenna of the wireless charging module 106 to communicate with the antenna 110 of the wireless charging pad 102 without having interface from metal enclosure. In different embodiments, the non-metallic portion 118 can be substantially the same size as the antenna 118, can be larger than the antenna but smaller that the wireless charging module 106, can substantially the same size as the wireless charging module, can be larger than the wireless charging module, or the like. The non-metallic portion 204 can be composed of any material that does not affect the power transfer between the antennas 110 and 118.

Referring back to FIG. 1, the wireless charging pad 102 can receive the presence signal from the information handling system 104, and can then set an initial power level to be provided from the wireless power source 108 to the wireless charging module 106. The initial power level can be a minimum power level available from the wireless charging pad 102, can be a maximum power level available from the wireless charging pad, or can be any power level in between the minimum and maximum power levels. The wireless charging pad 102 can then transmit the wireless power to the wireless charging module 106 via the antenna 110. The wireless charging pad 102 can use one or more techniques to provide power wirelessly, including inductive techniques, resonant inductive techniques, capacitive transfer techniques, beamed power transfer, such as laser or microwave transfer, or the like. However for purposes of discussion, it is assumed that the wireless charging pad 102 transfers power wirelessly using inductive power transfer. The plastic bottom portion 122 of the wireless charging module 106, the non-metallic portion 204 of the information handling system 104, and a space 124 between the antenna 110 and the antenna 118 can create an air gap for the inductive power transfer between the two antennas. The amount of power needed to be transferred from the antenna 110 to the antenna 118 can vary based on the space 124, which can be a calculated distance that is determined based on the height of the pads 116, the distance from the bottom portion 202 of the information handling system 104 and the bottom portion 122 of the wireless charging module 106, and a distance between the antenna 110 and the top of the wireless charging pad 102. The antenna 118 of the wireless charging module 106 can receive the wireless power from the antenna 110 and can provide the power to the wireless charger 120, which in turn can convert the power to be used by the information handling system 104.

The information handling system 104 can monitor its current operating conditions and can determine whether to change a power state of the information handling system. For example, if the information handling system 104 is receiving the maximum amount of power from the wireless charging pad 102 and then the information handling system enters a lower power mode, the information handling system can send a power state change signal to the wireless charging pad 102. The power state change can indicate a new power state for the information handling system 104. The wireless charging pad 102 can receive the power state change signal and can adjust the power level provided by the wireless power source 108 to the information handling system 104, such that a proper power level is provided to the information handling system without having excess power that is not used or not having enough power for the information handling system. The information handling system 104 can continually monitor its operating mode and can provide any necessary state change signals to the wireless charging pad 102.

Figure 3:
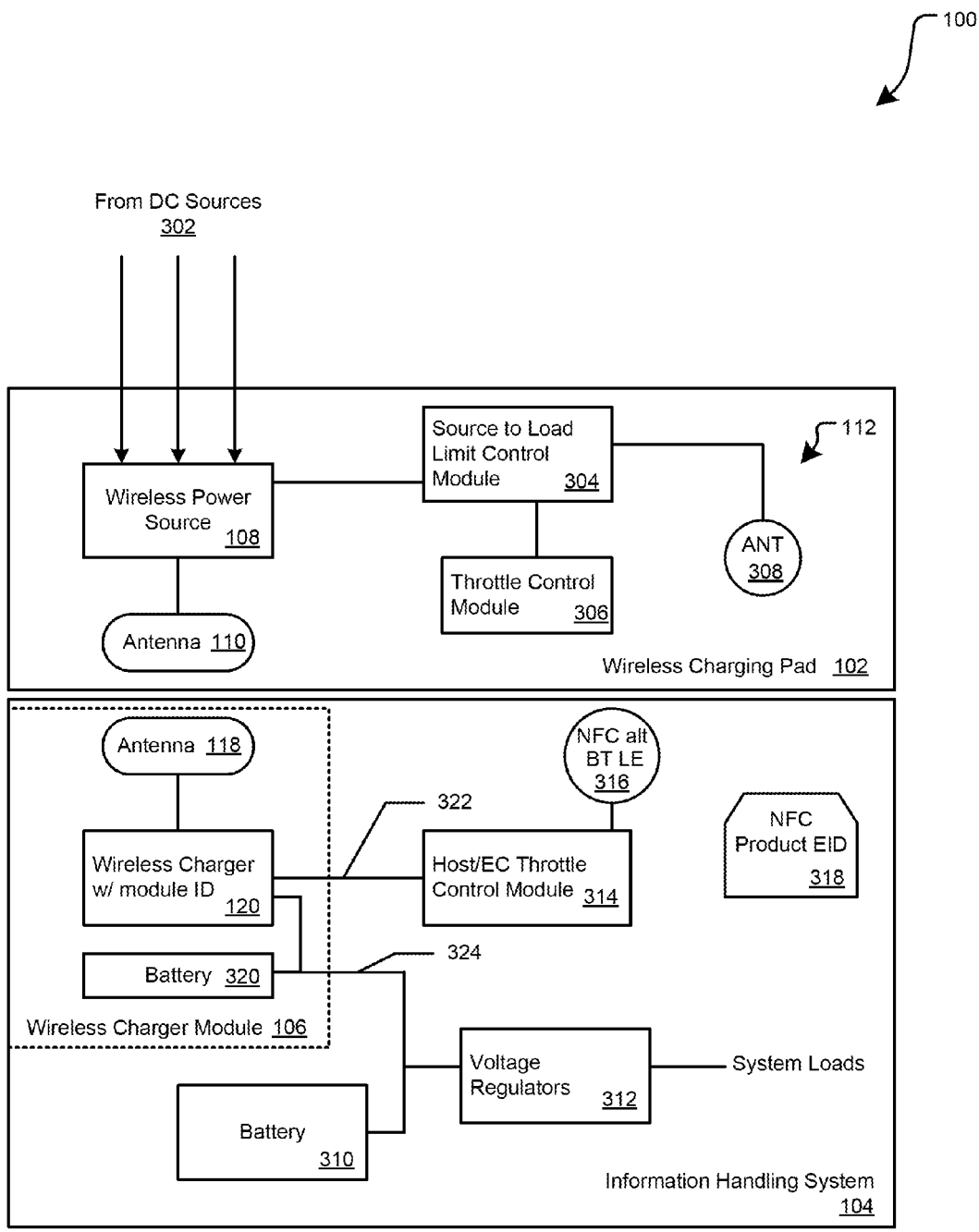
FIG. 3 is a more detailed block diagram of the wireless power delivery system.

FIG. 3 shows a more detailed embodiment of the wireless power delivery system 100 including the wireless charging pad 102, the information handling system 104, and a plurality of direct current DC sources 302. The wireless charging pad 102 includes the landing pad 112, which in turn includes a source-to-load limit control module 304, a throttle control module 306, an antenna 308, the wireless power source 108, and the antenna 110. The antenna 110 is in communication with the wireless power source 108. The wireless power source 108 is in communication with the source-to-load limit control module 304, which in turn is in communication with the throttle control module 306 and with the antenna 308.

The information handling system 104 includes a battery 310, voltage regulators 312, a host/embedded controller (EC) throttle control module 314, a near field communication (NFC) alternative Bluetooth Low Energy (BT LE) antenna 316, and a NFC product Electronic Data Identification (EDID) tag 318. The wireless charging module 106 includes a battery 320, the antenna 118, and the wireless charger 120. The antenna 118 is in communication with the wireless charger 120, which in turn is in communication with the host/EC throttle control module 314 via the communication bus 322. The wireless charger 120 is also in communication with the battery 320, with the battery 310, and with the voltage regulators 312 via the power connector 324. In an embodiment, the power connector 324 can be a system management bus, and the power connector can also include low power pins to provide power to logic components in the wireless charging module 106.

The voltage regulators 312 can provide multiple regulated voltages to different systems loads of the information handling system 104, such as a central processing unit, a memory, a display device, and the like. The host/EC throttle control module 314 is in communication with the NFC alternate BT LE antenna 316. The host/EC throttle control module 314 can be a hardware module, a software module, and/or any combination of a hardware and software module. For example, the host/EC module 314 can be a power management integrated circuit, a power management unit, or the like. The plurality of DC sources 302 can include an automatic air source, an alternating current (AC)-to-DC source, and a universal serial bus (USB) power source, or the like.

When the wireless charging module 106 is connected to the information handling system 104, the wireless charger 120 can communicate with the host/EC throttle control module 314 of the information handling system to provide information about the wireless charging module. For example, information can include a class of the wireless charging module 106, an amount of power that the wireless charging module can provide, a type of the wireless charging module, and the like. The host/EC throttle control module 314 can use the information to detect whether the wireless charging module 106 is compatible with a power system of the information handling system. When the host/EC throttle control module 314 has determined that the wireless charging module 106 is compatible with the information handling system, the host/EC throttle control module can set the power system of the information handling system in a ready state to receive power from the wireless charging module 106.

When the information handling system 104 containing the wireless charging module 106 is placed within a NFC range of landing pad 112 of the wireless charging pad 102, the NFC product EDID tag 318 can transmit a presence signal, referred to as a chirp, to indicate that the information handling system is within range of the wireless charging pad. The presence signal can be a repeating pulse that can be received by the antenna 308, which in turn can provide the presence signal to the source-to-load limit control 306. In an embodiment, the presence signal from the NFC product EDID tag 318 can also include information about the wireless charging module 106, such as a class of the wireless charging module.

When the source-to-load limit control module 304 receives the presence signal from the antenna 308, the source-to-load limit control module determines whether another signal is received from the throttle control module 306. If a signal is not received from the throttle control module 306, the source-to-load limit control module 304 can set an operation level of the wireless charging pad 102 to an initial operation level, such as a minimum level. The source-to-load limit control module 304 can send the operation level to the wireless power source 108, which can receive power from one of the DC power sources 306.

The wireless power source 108 can then provide power to the antenna 110, which in turn can wirelessly provide the power to the antenna 118 of the wireless charging module 106. The wireless charging pad 102 can use one or more techniques to provide power wirelessly, including inductive techniques, resonant inductive techniques, capacitive transfer techniques, beamed power transfer, such as laser or microwave transfer, or the like. In an embodiment, the plastic portion 122 (shown in FIG. 1) of the wireless charging module 106 and the non-metallic portion 204 (shown in FIG. 2) of the information handling system 104 can enable the power to be provided from antenna 110 to antenna 118 via inductive power transfer.

The antenna 118 can receive the wireless power from the antenna 110, and can provide power to the wireless charger 120. The wireless charger 120 can then convert the power received from the antenna 118 to a power level and a voltage level that can be utilized by the information handling system 104, such as forty-five or sixty-five Watts and nineteen and a half volts. The wireless charger 120 can either supply the converted power to the battery 310 or the voltage regulators 312. The power provided to the battery 310 can be used to charge the battery, and the power provided to the voltage regulators 312 can be supplied at a proper voltage to the remaining components of the information handling system 104. If the battery 310 is fully charged and the information handling system 104 does not require the entire amount of power received by the wireless charging module 106 from the wireless charging pad 102, the wireless charger 120 can provide the remaining power to the battery 320. The power provided to the battery 320 can be used to charge the battery, which can be used as a secondary battery for the information handling system 104.

The host/EC throttle control module 314 can receive information about the power provided by the wireless charging pad 102 from the wireless charger 120. The information can include whether the wireless charging pad 102 is compatible with the wireless charger converter, a total amount of power that the wireless charging pad is able to provide, or the like. The host/EC throttle control module 314 can also determine information about the information handling system 104, such as a percentage of the batteries 310 and 320 that is charged, an operation mode of the information handling system, and the like.

If the host/EC throttle control module 314 determines that the wireless charging pad 102 is not compatible with the class of the wireless charging module 106, the host/EC throttle control module can set a flag to cause the wireless charger 120 not to receive power from the wireless charging pad. The host/EC throttle control module 314 can also notify the user, via a display device, that the information handling system 104 is not receiving power from the wireless charging pad 102. If the host/EC throttle control module 314 determines that the wireless charging pad 102 is compatible with the wireless charging module 106, the host/EC throttle control module 314 can determine an amount of power that is available from the wireless charging pad. If the host/EC throttle control module 314 determines that the maximum amount of power available from the wireless charging pad 102 is less than the amount needed to operate the information handling system 104 at maximum power, the host/EC throttle control module can modify an operating mode of the information handling system, such as operating below the maximum power. For example, the host/EC throttle control module 314 can cause the information handling system 104 to enter a standby or low power mode in response to determining that the maximum amount of power available from the wireless charging pad 102 is substantially less than the amount needed by the information handling system. The host/EC throttle control module 314 can cause the information handling system 104 to remain in the low power mode while the battery 310 is charged to a high enough capacity to operate the information handling system. In another embodiment, the host/EC throttle control module 314 can reduce the operational mode the information handling system 104, such that the voltage supplied to the central processing unit, the memory, and other components of the information handling system is reduced.

If the host/EC throttle control module 314 determines that the wireless charging pad 102 can provide more power than needed by the information handling system for maximum operation power, the host/EC throttle control module can determine a power state needed for the information handling system and can send the power state to the throttle control module 306. When the throttle control module 306 receives the power state from the host/EC throttle control module 314, the throttle control module can determine an operation level for the wireless charging pad 102. The throttle control module 306 can then send the operation level to the source-to-load limit control module 304, which in turn can determine an amount of power to be provided by the wireless power source 108. The source-to-load limit control module 304 can send a signal to the wireless power source 108 to set the power level for the wireless power source to provide to the information handling system 104 via the antenna 110.

The wireless charger 120 can receive power from the antenna 118 and can provide the power to the battery 310, the voltage regulators 312, or the battery 320. While the wireless charging module 106 is receiving power from the wireless charging pad 102, the host/EC throttle control module 314 can continually monitor the operational mode of the information handling system 104 and can adjust the power state provided to the throttle control module 306. For example, the information handling system 104 may operate in a maximum power mode, and may switch to a low power mode such that the information handling system does not need the same amount of power. The power state can indicate the amount of power to be provided to the wireless charging module 106 connected the information handling system 104. In this situation, the host/EC throttle control module 314 can determine a new power state and send the new power state to the throttle control module 306, which in turn can adjust the operation level of the wireless charging pad 102. The change in the operation level of the wireless charging pad 102 can result in a change in the amount of power provided to the information handling system 104.

If the wireless charging pad 102 cannot provide the amount of power requested by the host/EC throttle control module 314 or any amount of power to the information handling system 104, the wireless charging pad can send information to the host/EC throttle control module 314 to indicate the current power available. The host/EC throttle control module 314 can then set a flag to indicate that a certain amount of power cannot be received from the wireless charging pad 102. The host/EC throttle control module 314 can also set a flag when the battery 310 is fully charged, and another flag when the battery 320 is fully charged. The host/EC throttle control module 314 can then send information to the throttle control module 306 to indicate that the information handling system 104 does not currently need power from the wireless charging pad 102.

When the information handling system 104 and the wireless charging module 106 are no longer in communication with the wireless charging pad 102, the host/EC throttle control module 314 can clear any flags set. Thus, if the information handling system 104 begins to communicate with the wireless charging pad 102 again, the communication and setup between host/EC throttle control module 314 and the throttle control module 306 can restart as described above. In another embodiment, when the information handling system 104 is no longer in communication with the wireless charging pad 102, the host/EC throttle control module 314 can continue to maintain the flags indicating that the batteries 310 and 320 are fully charged until a point in time, if any, that one or both of the batteries becomes less than fully charged.

Figure 4:
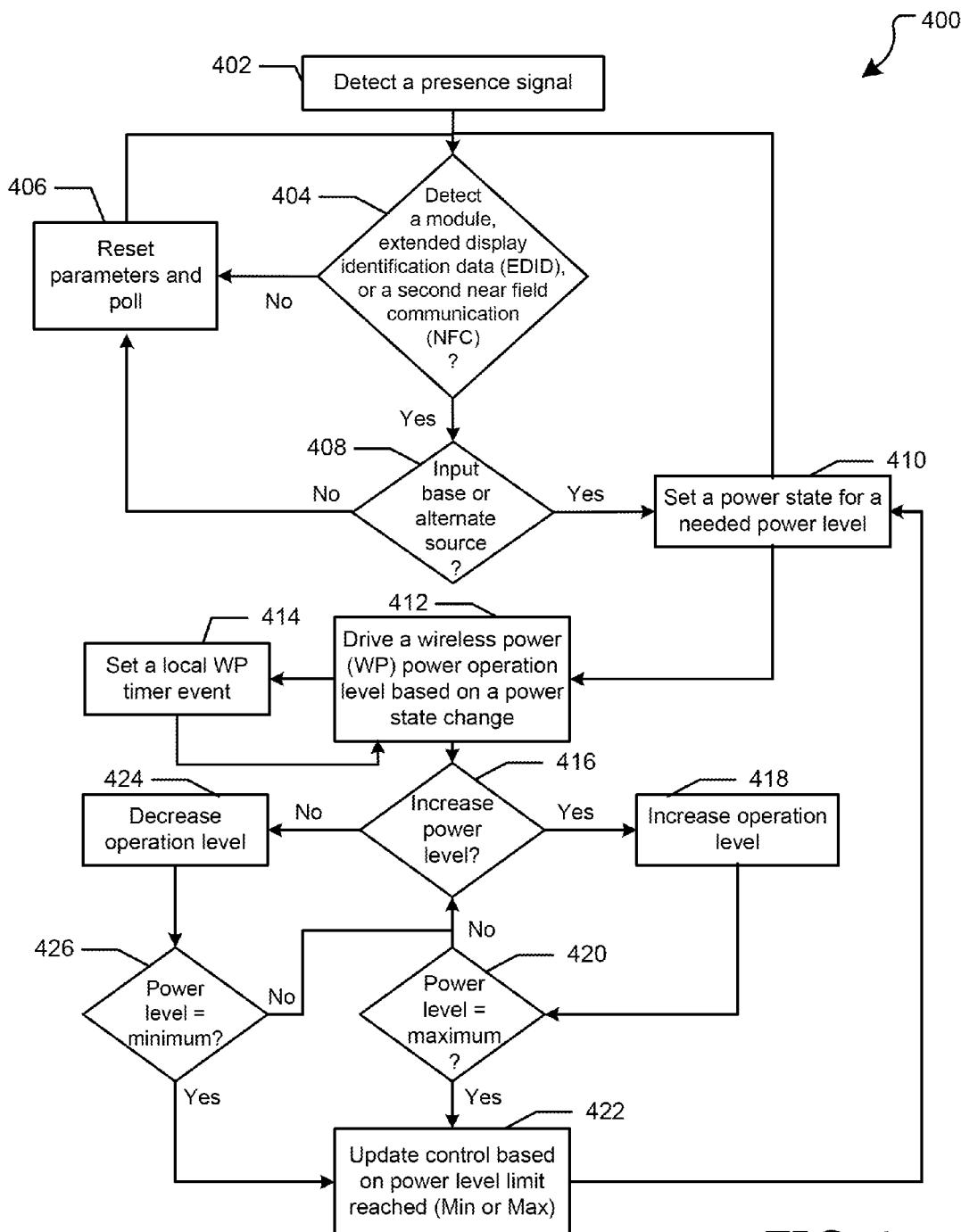
FIG. 4 shows a flow diagram of a method for controlling an amount of power provided from the wireless power delivery system.

FIG. 4 shows a flow diagram of a method 400 for controlling an amount of power provided from a wireless power delivery system. At block 402, a presence signal is received from an information handling system. The presence signal can be received at a wireless charging pad via a near field communication (NFC) signal. In an embodiment, the presence signal can be a signal indicating that the information handling system is present, can be the signal combined with a class identifier for the information handling system, or the like. The class identifier can indicate a maximum amount of power that the information handling system needs during operation. At block 404, a determination is made whether a wireless charging module is detected, electronic device identification (EDID) information is received, or a second NFC signal is received. The EDID can include information about the power requirements for the information handling system, such as the maximum power the information handling system can receive, a nominal power for the information handling system, whether the information handling system is charging, in a low power mode, whether the an auxiliary battery needs to be charged, whether the information handling system is in standby mode, or the like.

If a state change, EDID information, and/or a second NFC signal are not received, power parameters of the wireless power delivery system are reset and the wireless power delivery system continues to poll the information handling system at block 406, and the flow continues as stated above at block 404. The wireless charging pad can provide a minimum power level when the power parameters are reset. If the state change, EDID information, and/or a second NFC are received, a determination is made whether an input base source or alternate power source is available at block 408. If an input base source or an alternative power source is not available, then the flow continues as stated above at block 406. If input base source or an alternative power source is available, then a power state needed for the information handling system is set at block 410.

At block 412, the new power state is used to drive a wireless power operation level of the wireless charging pad of the wireless power delivery system. A local wireless power time event is set at block 414, and then the flow returns to block 412 when the time event expires. The timer event can be a length of time to provide power the information handling system in the wireless power operation level. At block 416, a determination is made whether a power level of the wireless power delivery system needs to be increased based on the wireless power operation level. If the power level needs to be increased, the operation level is increased at block 418, and a determination is made whether the power level is at a maximum at block 420. In an embodiment, adjusting the operation level directly adjusts the power level provided by the wireless charging pad. If the operation level is not at a maximum the flow continues as state above at block 416. If the operation level is at the maximum, the control of the wireless power delivery system is updated based on the power level maximum being reached at block 422, and the flow continues as stated above at block 410.

However, if the power level does not need to be increased, the operation level of the wireless power delivery system is decreased at block 424. At block 426, a determination is made whether a minimum operation level of the wireless delivery system is reached. If the operation level is not at a minimum the flow continues as state above at block 416. If the operation level is at the minimum, the control of the wireless power delivery system is updated based on the power level minimum being reached at block 422, and the flow continues as stated above at block 410.

Figure 5:
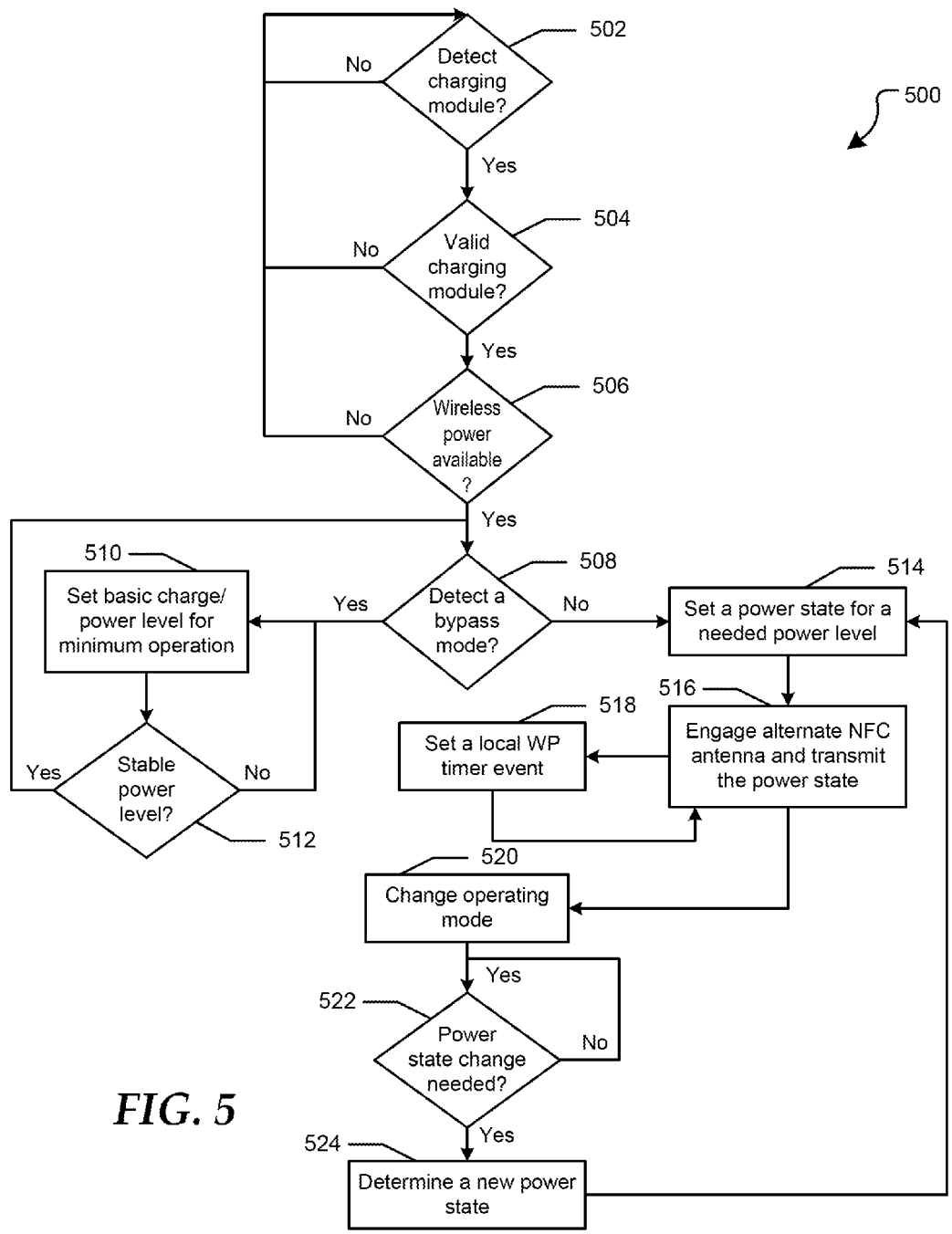
FIG. 5 shows a flow diagram of a method for controlling an amount of power received at an information handling system from the wireless power delivery system.

FIG. 5 shows a flow diagram of a method 500 for controlling an amount of power to be received at an information handling system from a wireless power delivery system. At block 502, a determination is made whether a wireless charging module is detected in the information handling system. When the wireless charging module is detected, a determination is made whether the wireless charging module is valid at block 504. The determination of whether wireless charging module is valid can be whether the wireless charging module is compatible with the power level requirements of the information handling system. If the wireless charging module is not valid, the flow continues as stated above at block 502. When the wireless charging module is valid a determination is made whether a valid wireless power source, such as a wireless charging pad, is available at block 506. If a valid wireless power source is not available, then the flow continues as stated above at block 502. If a valid wireless power source is available, a determination is made whether the information handling system is in bypass mode at block 506. If the information handling system is in bypass mode, then a minimum power level for the information handling system is set based on the information handling system being in a bypass mode at block 508. At block 510, a determination is made whether a stable host power is detected for the information handling system. If a stable power is not detected, the flow continues as stated above at block 508. If a stable power is detected, the flow continues as stated above at block 506.

If the information handling system is not in the bypass mode, a power state of a needed power level is set at block 512. At block 514, an alternate near field communication (NFC) antenna is engaged and a power state is transmitted to the wireless charging pad. A local wireless power time event is set at block 516, and then the flow returns to block 514 when the time event expires. The timer event can be a length of time to provide power the information handling system in the wireless power operation level. At block 518, an operating mode of the information handling system is changed. A determination is made whether a power state change is needed at block 520. When a power state change is needed, a new power state is determined at block 522, and the flow continues as stated above at block 512.

Figure 6:
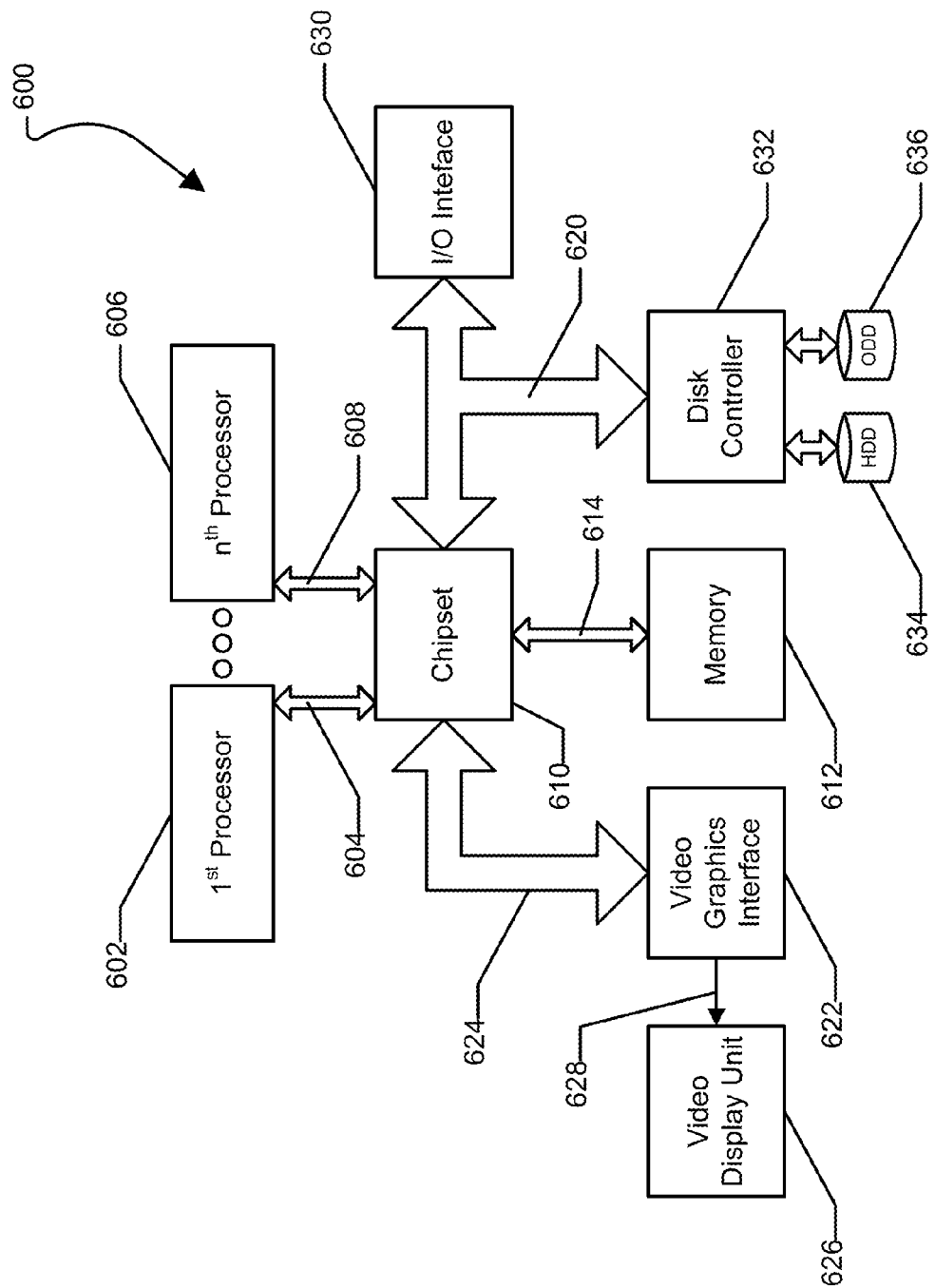
FIG. 6 is a block diagram of a general information handling system.

As shown in FIG. 6, an information handling system 600, such as information handling system 100, can include a first physical processor 602 coupled to a first host bus 604 and can further include additional processors generally designated as $n^{th}$ physical processor 606 coupled to a second host bus 608. The first physical processor 602 can be coupled to a chipset 610 via the first host bus 604. Further, the $n^{th}$ physical processor 606 can be coupled to the chipset 610 via the second host bus 608. The chipset 610 can support multiple processors and can allow for simultaneous processing of multiple processors and support the exchange of information within information handling system 600 during multiple processing operations.

According to one aspect, the chipset 610 can be referred to as a memory hub or a memory controller. For example, the chipset 610 can include an Accelerated Hub Architecture (AHA) that uses a dedicated bus to transfer data between first physical processor 602 and the $n^{th}$ physical processor 606. For example, the chipset 610, including an AHA enabled-chipset, can include a memory controller hub and an input/output (I/O) controller hub. As a memory controller hub, the chipset 610 can function to provide access to first physical processor 602 using first bus 604 and $n^{th}$ physical processor 606 using the second host bus 608. The chipset 610 can also provide a memory interface for accessing memory 612 using a memory bus 614. In a particular embodiment, the buses 604, 608, and 614 can be individual buses or part of the same bus. The chipset 610 can also provide bus control and can handle transfers between the buses 604, 608, and 614.

According to another aspect, the chipset 610 can be generally considered an application specific chipset that provides connectivity to various buses, and integrates other system functions. For example, the chipset 610 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 610. The chipset 610 can also be packaged as an application specific integrated circuit (ASIC).

The information handling system 600 can also include a video graphics interface 622 that can be coupled to the chipset 610 using a third host bus 624. In one form, the video graphics interface 622 can be an Accelerated Graphics Port (AGP) interface to display content within a video display unit 626. Other graphics interfaces may also be used. The video graphics interface 622 can provide a video display output 628 to the video display unit 626. The video display unit 626 can include one or more types of video displays such as a flat panel display (FPD) or other type of display device.

The information handling system 600 can also include an I/O interface 630 that can be connected via an I/O bus 620 to the chipset 610. The I/O interface 630 and I/O bus 620 can include industry standard buses or proprietary buses and respective interfaces or controllers. For example, the I/O bus 620 can also include a Peripheral Component Interconnect (PCI) bus or a high speed PCI-Express bus. In one embodiment, a PCI bus can be operated at approximately 66 MHz and a PCI-Express bus can be operated at more than one speed, such as 2.5 GHz and 4 GHz. PCI buses and PCI-Express buses can be provided to comply with industry standards for connecting and communicating between various PCI-enabled hardware devices. Other buses can also be provided in association with, or independent of, the I/O bus 620 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 610 can be a chipset employing a Northbridge/Southbridge chipset configuration (not illustrated). For example, a Northbridge portion of the chipset 610 can communicate with the first physical processor 602 and can control interaction with the memory 612, the I/O bus 620 that can be operable as a PCI bus, and activities for the video graphics interface 622. The Northbridge portion can also communicate with the first physical processor 602 using first bus 604 and the second bus 608 coupled to the $n^{th}$ physical processor 606. The chipset 610 can also include a Southbridge portion (not illustrated) of the chipset 610 and can handle I/O functions of the chipset 610. The Southbridge portion can manage the basic forms of I/O such as Universal Serial Bus (USB), serial I/O, audio outputs, Integrated Drive Electronics (IDE), and ISA I/O for the information handling system 600.

The information handling system 600 can further include a disk controller 632 coupled to the I/O bus 620, and connecting one or more internal disk drives such as a hard disk drive (HDD) 634 and an optical disk drive (ODD) 636 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail in the exemplary embodiments without materially departing from the novel teachings and advantages of the embodiments of the present disclosure. For example, the methods described in the present disclosure can be stored as instructions in a computer readable medium to cause a processor, such as chipset 610, to perform the method. Additionally, the methods described in the present disclosure can be stored as instructions in a non-transitory computer readable medium, such as a hard disk drive, a solid state drive, a flash memory, and the like. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a wireless charging module to fit at least partially within the information handling system, the wireless charging module including:
      an antenna disposed within a plastic lower portion of the wireless charging module, the plastic lower portion of the wireless charging module to enable the antenna to wirelessly receive power from a wireless charging pad; and
      a wireless charger disposed within the wireless charging module, the wireless charger to communicate with the antenna, the wireless charger to provide power to the information handling system; and
   a non-metallic section disposed within a metal bottom surface of a body of the information handling system, wherein the non-metallic section is disposed at a particular location within the metal bottom surface to be positioned below the antenna of the wireless charging module to enable the antenna to wirelessly receive power from the wireless charging pad.

2. The information handling system of claim 1 further comprising:
   a first battery in communication with the wireless charger, the first battery to store power received from the wireless charger.

3. The information handling system of claim 1 wherein the wireless charger is further to communicate information associated with the wireless charging module to the information handling system.

4. The information handling system of claim 1 further comprising:
   a power connector to provide the power from the wireless charger to the information handling system.

5. The information handling system of claim 4 wherein the power connector is selected from a group consisting of a system management bus and a communication bus.

6. The information handling system of claim 4 wherein the power connector includes low power pins to drive power to logic components in the wireless charging module.

7. An information handling system comprising:
   a wireless charging module to fit at least partially within the information handling system and to provide power to the information handling system, the wireless charging module including:
      an antenna disposed within a plastic lower portion of the wireless charging module, the plastic lower portion of the wireless charging module to enable the antenna to wirelessly receive power from a wireless charging pad; and
   a non-metallic section disposed within a metal bottom surface of a body of the information handling system, wherein the non-metallic section is disposed at a particular location within the metal bottom surface to be positioned below the antenna of the wireless charging module to enable the antenna to wirelessly receive power from the wireless charging pad.

8. The information handling system of claim 7 further comprising:
   a first battery in communication with the wireless charging module, the first battery to store power received from the wireless charging module.

9. The information handling system of claim 7 wherein the wireless charging module is further to communicate information associated with the wireless charging module to the information handling system.

10. The information handling system of claim 7 further comprising:
a power connector to provide the power from the wireless charging module to the information handling system.

11. The information handling system of claim 10 wherein the power connector is selected from a group consisting of a system management bus and a communication bus.

12. The information handling system of claim 10 wherein the power connector includes low power pins to drive power to logic components in the wireless charging module.

13. An information handling system comprising:
a wireless charging module to fit at least partially within the information handling system, the wireless charging module including:
an antenna disposed within a plastic lower portion of the wireless charging module, the plastic lower portion of the wireless charging module to enable the antenna to wirelessly receive power from a wireless charging pad; and
a wireless charger disposed within the wireless charging module, the wireless charger to communicate with the antenna, the wireless charger to provide power to the information handling system;
a non-metallic section disposed within a metal bottom surface of a body of the information handling system, wherein the non-metallic section is disposed at a particular location within the metal bottom surface to be positioned below the antenna of the wireless charging module to enable the antenna to wirelessly receive power from the wireless charging pad;
a first battery in communication with the wireless charger, the first battery to store power received from the wireless charger; and
a power connector to provide the power from the wireless charger to the information handling system.

14. The information handling system of claim 13 wherein the wireless charger is further to communicate information associated with the wireless charging module to the information handling system.

15. The information handling system of claim 13 wherein the power connector is selected from a group consisting of a system management bus and a communication bus.

16. The information handling system of claim 13 wherein the power connector includes low power pins to drive power to logic components in the wireless charging module.

* * * * *